United States Patent Office 3,471,422
Patented Oct. 7, 1969

3,471,422
TIME-TEMPERATURE RESPONSIVE COLOR CHANGING TYPOGRAPHIC PRINTING INK COMPOSITION
Saul Edlein, Forest Hills, David R. Kasanof, New York, and Elias Kimmel, Great Neck, N.Y., assignors to Tempil Corporation, New York, N.Y., a corporation of New York
No Drawing. Continuation-in-part of application Ser. No. 111,479, May 22, 1961. This application June 17, 1966, Ser. No. 558,276
Int. Cl. C09d 5/26
U.S. Cl. 260—22    5 Claims

ABSTRACT OF THE DISCLOSURE

A temperature responsive color changing typographic printing ink includes a heat activated color changing pigment dispensed in an alkyd resin vehicle comprising the reaction product of 65% to 72% linseed oil, 11% to 13% pentaerythritol and 17% to 22% phthalic anhydride. The pigment constitutes 5% to 30% of the ink and includes a polyvalent metal compound such as lead and sulphur or a reactant sulphur compound.

---

The present application is a continuation-in-part of copending U.S. patent application Serial No. 111,479, filed May 22, 1961, now abandoned.

The present invention relates generaly to improvements in time-temperature responsive color changing system, and in particular it relates to an improved ink which provides an impression responding by a distinct color change to predetermined ambient time-temperature conditions.

Time-temperature responsive color changing indicators of the subject type are widely used in the form of cards, paper strips, tapes and the like in connection with the autoclave sterilization in hospitals of surgical instruments, bandages and other paraphernalia. While the use of this type of indicator would be highly desirable in many other fields as a measurement of the degree of treatment, such as in the processing of foods, pharmaceuticals and other materials where close process control is frequently required, the deficiencies of the present devices have prevented their widespread acceptance and general use in these fields. A stable ink possessing a long shelf life and capable of application to any desired surface by conventional printing procedures and providing a stable time-temperature responsive color changing impression of adjustable uniform and constant response characteristics has been long sought after. Such an ink would permit the marking of packages or containers by conventional automatic handling equipment with accurate time-temperature indicators, and these packages may then be processed and readily and easily examined to determine the adequacy of their treatment at elevated temperatures.

There are many well known pigment compositions which respond by a color change to exposure to predetermined temperatures for predetermined times. These are typified by mixtures of non-sulphur compounds of polyvalent metals with sulphur or of mixtures of these compounds with sulphur compounds. Examples of the polyvalent metal compounds are lead oxide which is yellow orange and reacts with sulphur to form a black head sulfide; nickel carbonate which is green and reacts with sulphur to form a black nickel sulfide; copper hydroxide which is blue and reacts with sulphur to form a blue-black copper sulfide; and basic lead carbonate which is white and reacts with sulphur to form black lead sulfide. Instead of the sulphur, a sulphur compound may be employed. For example, a white mixture of basic lead carbonate and thiocarbanilide reacts to form black lead sulfide and an orange mixture of lead acetate and antimony sulfide reacts to form a deep brown lead sulfide. The above reactions may be affected under the normal sterilizing autoclave ambient conditions, for example, in the presence of 240° F.–250° F. steam at a pressure of 10 to 20 pounds per square inch for a period of 15 to 30 minutes, the specific parameters depending on the pigment and vehicle and their condition. Heretofore, however, when these temperature responsive color changing pigments were compounded into an ink, the results have been highly unsatisfactory. The inks were highly unstable and had a shelf life of the order of minutes or at most a few hours. Moreover, the impressions produced by the ink greatly varied in their time-temperature response and hence were not reliable. These inks possessed other drawbacks and disadvantages and left much to be desired.

It is, therefore, a principal object of the present invention to provide an improved time-temperature responsive color changing composition.

Another object of the present invention is to provide an improved ink which leaves a time-temperature responsive color changing impression.

Still another object of the present invention is to provide a time-temperature indicating ink of the above nature which is highly stable and possesses long shelf life.

A further object of the present invention is to provide time-temperature sensitive inks which may be readily and easily applied by letter press, flexographic methods, silk screen or other conventional processes.

Still a further object of the present invention is to provide a time-temperature sensitive ink which may be applied to various surfaces.

Another object of the present invention is to provide an ink of the above nature which forms an impression producing a distinct and sharp color change when exposed to a predetermined temperature for a predetermined time, such impression being highly stable and of uniform and constant response and the response characteristics being adjustable within relatively wide ranges.

The above and further objects of the present invention will become apparent from a reading of the following description, wherein preferred embodiments thereof are set forth merely by way of illustration.

It has been discovered that the time-temperature response of color changing pigments of the present nature are highly sensitive to the characteristics and properties of the binding or supporting vehicle. In this connection, time-temperature responsive color changing pigment compositions carried in vehicles as heretofore employed and proposed had shelf lives not exceeding a few minutes or hours and effected an impression having little stability and a widely varying response.

It has been found that the presence of unsaturated compounds such as are present in ink vehicles of a so-called "drying" type may have a considerable accelerating effect on the reaction under ambient conditions and, if not properly chosen, yields unstable products and prints. Mixtures based on a linseed oil vehicle are particularly unstable and cannot satisfactorily be used. Exploitation of this fact is an important factor in successfully formulating a suitable ink composition in accordance with the present invention. In addition, the nature of the hydrocarbon skeleton of the organic vehicle or binder molecules influences the rate of reaction under autoclave conditions. Improper choice of organic binder or vehicle will result in a pigment system which will not react under autoclaving conditions. Paraffinic hydrocarbons, such as mineral oil, mineral wax, polyethylene, etc. can be used to accelerate the reaction (reduce the indicating temperature or residence time for indication) without materially affecting the stability properties of the bulk coating materials or the marks made with them.

Moisture also greatly affects the rate of reaction at any temperature. Its absence during sterilization will raise the signal temperature significantly or prohibit the indication. By regulating the type and quantity of vehicle in a pigment-vehicle mixture, the amount of moisture available to the reactive pigment during sterilization may be varied and the signalling conditions correspondingly varied. During storage, the presence of moisture, or hygroscopic materials (such as glycerine) which will absorb moisture and bring the reactive pigments in contact with it, will materially shorten the shelf life of an ink or its print, and must be scrupulously avoided. Here also, the protective properties of a properly chosen vehicle may be utilized to shield a sensitive pigment system from an unfavorable storage environment. The purest of reactive compounds are required for the most stable products and prints, some impurities exerting a great influence on the stability of the final product. Similarly, trace impurities in the paper (or other material) to be printed, decorated or marked may adversely affect the longevity of the print and should be given adequate consideration.

The stable, paste-type printing inks, according to the present invention, are formulated in view of the above findings. The vehicle employed is chosen to impart the desired degree of reactivity to the pigment system. Its "unsaturated" nature has no effect on the reacting materials at normal storage or room temperatures. At elevated temperature, such as those encountered under sterilizing conditions, it enables the reaction to proceed. Although, by nature, a water repellent material that protects the pigment system under the usual bulk and print storage conditions—even under conditions of high humidity—it permits access of the necessary water vapor to the pigments under sterilization conditions. It has been found that a synthetic, polymeric vehicle, classified as an "oil-modified alkyd," when properly selected, could be employed. More specifically, an alkyd resin produced from a mixture of phthalic anhydride, pentaerythritol and the fatty acids derived from alkali-refined linseed oil is used to advantage. It has a viscosity, at 25° C., of 60–75 poises, an acid number of 9–12, and has an oil to phthalic acid ratio of 3.68 to 1. Similarly, synthesized vehicles with a higher ratio do not have the necessary high stability properties. Those with a lower oil to phthalic acid ratio were not used because of viscosity considerations. The purest materials, commercially available, were employed in the color changing pigment mixture. Advantageously, the alkyd resin vehicle comprises the reaction product of by weight 65% to 72% of linseed oil, 11% to 13% of pentaerythritol and 17% to 22% of phthalic anhydride.

The following examples are given merely by way of illustration and are not intended to limit the scope of the present invention. Where percentages, parts or proportions are designated, these are given by weight.

Example I

A typographic ink embodying the present invention contained the following ingredients:

| | Percent |
|---|---|
| Lead oxide | 47.6 |
| Flowers of sulphur | 2.4 |
| Alkyd varnish (70% linseed oil, 11% pentaerythritol, 19% phthalic anhydride) | 49.5 |
| Cobalt octoate | 0.2 |
| Manganese octoate | 0.1 |
| Antiskinning agent | 0.2 |

The above, milled on a standard 3-roller mill yields a product suitable for use as a letter press ink. Prints will turn from yellow to black under steam autoclaving conditions. Inert pigments, such as titanium dioxide, may safely be added to extend, opacify or alter the signal-intensity of the above ink.

The quantity of sulphur in the ink should be of the order of 5%–10% based on the lead oxide. Concentrations of sulphur below 5% are reflected in weaker signals, while concentrations above 10% have no additional effect on the signal intensity. The quantity of sulphur present has no apparent effect on the stability of the ink, as much as 30% being tolerated. Varying the ratio of pigment to vehicle has no effect on stability properties. While a ratio of approximately 50:50 is indicated, this ratio may be varied to suit specific printing conditions. The physical characteristics of the ink may be altered further by incorporating small quantities of additives well-known to the art (e.g. polyethylene powder, lithium stearate, calcium stearate, etc.) and/or adding suitable naphtha solvents such as Amsco 140 solvent or mineral spirits, making possible the use of this formulation on various types of direct and offset printing equipment and for silk-screen printing. The antiskinning agent may be of any conventional composition, for example those described in U.S. Patent No. 2,306,016 granted Dec. 22, 1942.

The adhesion of these inks to glass and common packaging metals, like tinned iron and aluminum, is exceptionally good. The last three constituents, listed in the above ink formulation, are present for their effect on the drying properties on this type of ink and, within the concentration limits normally employed, have no effect on the stability of the inks or their prints.

Example II

A mixture of the following:

| | Percent |
|---|---|
| Basic lead carbonate | 60.5 |
| Thiocarbanilide | 9.0 |
| Alkyd varnish (70% linseed oil, 11% pentaerythritol, 19% phthalic anhydride) | 30.0 |
| Cobalt octoate | 0.2 |
| Manganese octoate | 0.1 |
| Antiskinning agent | 0.2 | was milled on a standard 3-roller mill, and yields a product suitable for use as a letter press ink. Prints will turn from white to black under steam autoclaving conditions. Modifying additives as described in Example I may be employed. The concentration of thiocarbanilide, the sulphur-bearing constituent of the pigment system, does not have any affect on the stability of the bulk ink or the prints under storage conditions. Any appreciable reduction will, however, reduce the intensity of the signal, while increasing the concentration above 10% has little effect on the signal. In this last formulation, too, the ratio of pigment to vehicle is decided by the physical properties of the desired ink and may be varied over a considerable range without affecting the stability of the ink.

Other color changing pigment mixtures than those given above may be employed provided that they react within the desired time-temperature range. Thus, various compounds of lead as well as other polyvalent metals, for example, cobalt, nickel, bismuth, cadmium, copper and the like may be employed and other sulphur compounds than those earlier identified may be used.

The temperature responsive color changing ink of the present composition is characterized by an unexpected color stability. The improved inks possess a shelf life of years in contrast to inks employing other vehicles where the shelf life may be only a few minutes or a few hours, and in many cases color changes are experienced with other known vehicles during the formulation or production of the ink.

While preferred embodiments of the present invention have been described, it is apparent that numerous alterations, omissions and additions may be made without departing from the spirit thereof.

What is claimed is:

1. A temperature sensitive color changing typographic printing ink comprising a pigment composition including a compound of a polyvalent metal selected from the class consisting of lead, copper, cobalt, nickel, bismuth and cadmium, and a sulphur material selected from the group consisting of sulphur and compounds of sulphur which are reactive with said polyvalent metal compounds above a predetermined temperature to effect a color change of said pigment, said pigment composition being dispersed in an alkyl resin vehicle comprising the reaction product of 17% to 22% of phthalic anhydride, 11% to 13% of pentaerythritol and 65% to 72% of linseed oil derived fatty acid, said pigment composition constituting between about 5% and 30% of said ink.

2. The printing ink of claim 1, wherein said pigment composition comprises a mixture of lead oxide and elemental sulphur.

3. The printing ink of claim 1, wherein said vehicle includes an organic solvent.

4. The printing ink of claim 1, wherein said alkyd resin has a viscosity at 25° C. of 60–75 poises and an acid number of 9–12.

5. The printing ink of claim 1, including an antiskinning agent.

References Cited

UNITED STATES PATENTS

| | | | |
|---|---|---|---|
| 2,049,507 | 8/1936 | McBurney et al. | 260—40 |
| 2,118,144 | 5/1938 | Berman et al. | 252—408 |
| 2,625,494 | 1/1953 | Morrison | 106—193 |
| 2,943,475 | 7/1960 | Benveniste et al. | 260—40 |
| 3,098,751 | 7/1963 | Huyck et al. | 252—408 |
| 3,266,920 | 8/1966 | Griffith | 252—408 |

OTHER REFERENCES

Apps, "Printing Ink Technology," 1958, Leonard Hill Limited, London, pp. 60–64 and 78–84.

DONALD E. CZAJA, Primary Examiner

R. W. GRIFFIN, Assistant Examiner

U.S. Cl. X.R.

252—408, 161, 132; 117—124; 106—28; 73—356